United States Patent
Pastoor et al.

(10) Patent No.: US 8,130,272 B2
(45) Date of Patent: Mar. 6, 2012

(54) METHOD FOR AUTOSTEREOSCOPICALLY PRODUCING THREE-DIMENSIONAL IMAGE INFORMATION FROM SCANNED SUB-PIXEL EXTRACTS AND DEVICE FOR CARRYING OUT SAID METHOD

(75) Inventors: Siegmund Pastoor, Berlin (DE); René de la Barré, Mittweida (DE)

(73) Assignee: Fraunhofer-Gesellschaft zur Forderung der angewandten Forschung e.V., Munich (DE)

(*) Notice: Subject to any disclaimer, the term of this patent is extended or adjusted under 35 U.S.C. 154(b) by 1303 days.

(21) Appl. No.: 11/720,707
(22) PCT Filed: Dec. 8, 2005
(86) PCT No.: PCT/DE2005/002220
§ 371 (c)(1),
(2), (4) Date: Jun. 1, 2007
(87) PCT Pub. No.: WO2006/069555
PCT Pub. Date: Jul. 6, 2006

(65) Prior Publication Data
US 2009/0278936 A1     Nov. 12, 2009

(30) Foreign Application Priority Data
Dec. 11, 2004     (DE) .......... 10 2004 059 729

(51) Int. Cl.
*H04N 5/225*     (2006.01)
(52) U.S. Cl. ..................... 348/169
(58) Field of Classification Search .......... 348/169
See application file for complete search history.

(56) References Cited

U.S. PATENT DOCUMENTS

| | | | |
|---|---|---|---|
| 6,075,557 A * | 6/2000 | Holliman et al. | 348/51 |
| 6,307,585 B1 | 10/2001 | Hentschke | 348/51 |
| 6,366,281 B1 * | 4/2002 | Lipton et al. | 345/419 |

(Continued)

FOREIGN PATENT DOCUMENTS

EP     0 354 851 A2     2/1990
(Continued)

OTHER PUBLICATIONS

Mashitan, Ken, Hamagishi, Goro, Higashino, Masahiro, Ando, Takahisa, Takemoto, Satoshi, Step Barrier System Multi-view Glassless 3-D Display, SPIE, pp. 265-272, vol. 5291, Stereoscopic Displays and Virtual Reality Systems XI.

(Continued)

*Primary Examiner* — Yasin Barqadle
(74) *Attorney, Agent, or Firm* — Brinks Hofer Gilson & Lione

(57) ABSTRACT

A method for autostereoscopically producing three-dimensional image information from scanned subpixel extracts uses a multiplex track method (MTV) having a separating raster (TR) obliquely extended with respect to a matrix screen (MB) and an electronic tracking (TS) of viewing areas ibased on two separated image views (L, R), that adjacently disposes two or three subpixels (SP) of each pixel (P) of the two image views (L, R) in the actual subpixel extraction (SPA), continuously and alternatingly preserving each subpixel address and disposes said subpixels (SP) in an overlapping manner on each other with an offset, whereby the resolution loss effects the subpixels (SP) only. The crosstalk resulting from the inclination of the separating raster (TR) is reduced by a special structure of the subpixel extraction (SPA), wherein the resolution homogenisation in two directions of the screen is simultaneously preserved. The formation of the actual subpixel extraction (SPA) is carried out according to multiplex schemes ($MUX_i$) predetermined according to an observer actual position. One or several observers can be electronically tracked subject to the distance thereof from the matrix screen (MB), and the image representation can be adapted therefor.

24 Claims, 11 Drawing Sheets

U.S. PATENT DOCUMENTS

| | | | |
|---|---|---|---|
| 6,804,415 B2 | 10/2004 | Van Overveld et al. | 382/293 |
| 6,859,240 B1 | 2/2005 | Brown et al. | 349/15 |
| 7,084,838 B2 | 8/2006 | Yoon | 345/6 |
| 7,091,931 B2 | 8/2006 | Yoon | 345/9 |
| 7,190,825 B2 | 3/2007 | Yoon | 382/154 |
| 7,336,326 B2 | 2/2008 | Kim et al. | 349/95 |
| 7,652,674 B2 * | 1/2010 | Feldman et al. | 345/582 |
| 2006/0158729 A1 * | 7/2006 | Vissenberg et al. | 359/462 |

FOREIGN PATENT DOCUMENTS

| | | |
|---|---|---|
| EP | 0 791 847 A1 | 8/1997 |
| WO | WO 99/05559 | 2/1999 |

OTHER PUBLICATIONS

Telecommunications Handbook, Dr.-Ing. Franz Arnold.

* cited by examiner

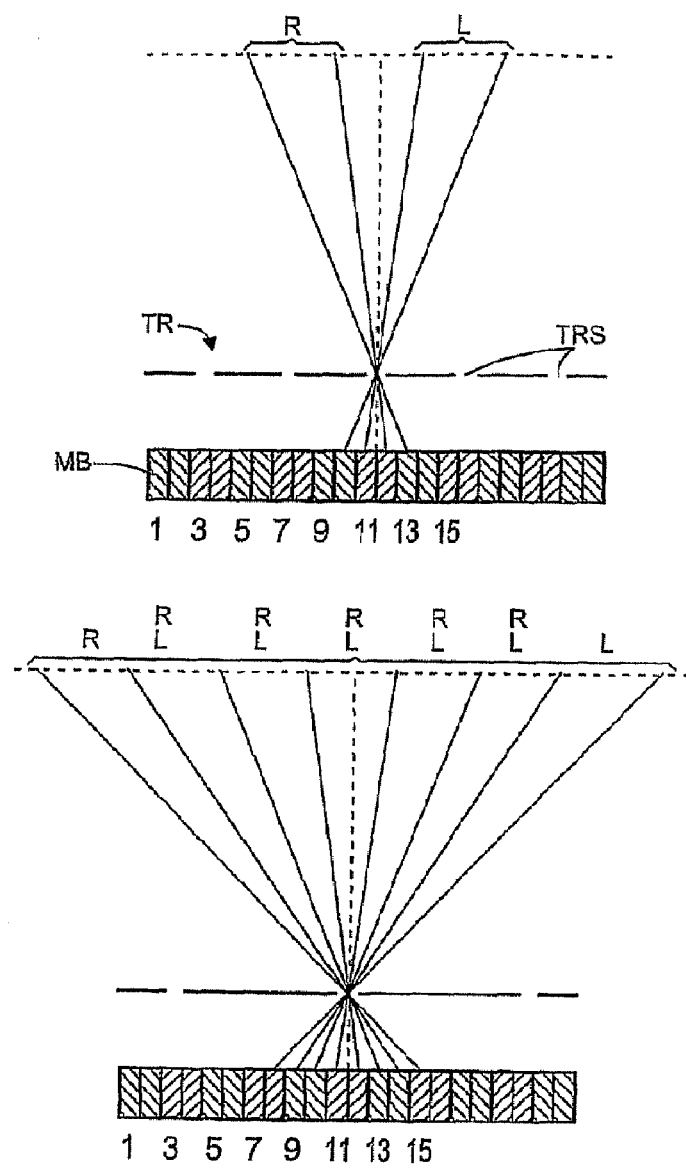
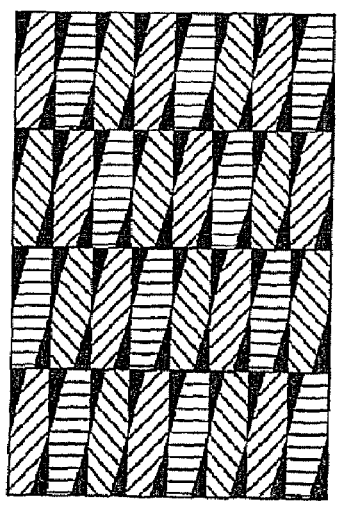
Fig.10
Fig.11

METHOD FOR AUTOSTEREOSCOPICALLY PRODUCING THREE-DIMENSIONAL IMAGE INFORMATION FROM SCANNED SUB-PIXEL EXTRACTS AND DEVICE FOR CARRYING OUT SAID METHOD

The invention refers to a method for the autostereoscopic production of three-dimensional image information from scanned subpixel extracts from at least a left and a right image view on a matrix screen having colour-assigned subpixels in scanning lines with an optical separating raster, wherein the periodicity of the separating elements in horizontal direction corresponds to a) four or b) six subpixels and the separating elements extend obliquely in relation to the matrix of the screen with an inclination corresponding to the small side ratio of the subpixels, as well as to an arrangement for implementing said method.

PRIOR ART

In the autostereoscopic representation methods as they are usable for multiple purposes e.g. for information and communication technology, medical engineering and computer and video engineering in both, public and private domains, the entire L-R-aligned stereoscopic separation is performed in the method and in the implementing system itself; additional personal user hardware, as for example glasses, are not required, which essentially increases the user comfort. The principle of autostereoscopic representation methods (cf. for example Publication I of S. Pastoor "3D-Displays: Methoden und Stand der Technik", Handbuch der Telekommunikation, Vol. 4, Chapter 4, supplementary delivery June 2002, Fachverlag Deutscher Wirtschaftsdienst GmbH & Co KG, Cologne, ISBN 3-87156-096-0) is based on a scanning of different image views on a screen and an optical separation of these scanned views in direction towards the eyes of a viewer so that each eye will only see parts of a single image view in an optical context that are joined together into a perspective view. For that purpose, the separating raster includes many adjacently arranged separating elements, e.g. slots, cylindrical lenses or prisms. Depending on the number of the discrete image views represented, a stereoscopic view can be generated with a single perspective (two discrete image views that are usually taken with interocular distance) or a parallax view with several individual perspectives (three or more discrete adjacent image views). While for a stereoscopic view, a relatively fixed viewing position or an optical tracking of the image output is required for enabling stereoscopic vision, a movement of the head leads to reaching another individual perspective in case of a parallax view. Preferably, the viewing zones for the individual perspectives adjoin seamlessly to one another. In known methods using parallax reproduction, however, the occurring crosstalk reduces the usable image depth. With an increasing image depth (disparity), the visibility and disturbing effect of the crosstalk increase. In a matrix screen designed as a direct viewing screen, the pixel number available for N individual perspectives is reduced to 1/N of the pixels of the matrix screen used. In commercially available flat screens (LCD, plasma displays, OLED, etc.), every pixel consists of three subpixels of the colours red, green and blue, the intensity value of which can be controlled.

For avoiding scan-effects and for achieving a nearly symmetrical resolution in horizontal and vertical screen directions, the optical separating raster therefore can be arranged turned by an angle in relation to the pixel raster in such kind of screens ("Slanted Raster Method", c. for example WO 99/05559 A1 or Publication II of van Berkel et al.: "Characterisation and Optimisation of 3D-LCD-Module Design" Proc SPIE vol 3012 pp 179-187, 1997). However, a basic disadvantage of that approach, apart from the strongly reduced individual image resolution, is the fact that the individual perspectives cannot be perfectly separated. That crosstalk of the adjacent stereo channels affects the spatial impression and reduces the image quality e.g. by blurring, multiple ghosting, contrast reduction and colour errors.

In order to achieve highest possible image quality with a high image resolution for an individual viewer, there have been described two-channel ("stereo channel", scanning of a left and a right image view) autostereoscopic methods that adapt, with the help of mechanical and/or electronic means, the viewing areas on the screen to the current position of the viewer's eyes ("tracking method", cf. for example EP 0 354 851 A2). The position of the eyes or pupils or of another detail of the head or eyes can be measured in a contactless and almost instantaneous manner with the help of known video methods. In that known two-channel method, the separating raster placed in front is arranged orthogonally to the pixel raster so that the resolution in the one (for example horizontal) direction is reduced to the half while it remains unchanged in the other (accordingly vertical) direction. For reducing the requirements on the exactness and response time of the tracking procedure for the eye position, it was proposed to introduce pixel reserves in the left and right image columns of the respectively scanned stereo pair (cf. for example DE 197 36 035 A1). That way, there is achieved a certain tolerance with regard to head movements of the viewer, but with the disadvantage that the already halved resolution in the one direction is further reduced. In autostereoscopic methods using quick electronic tracking, adjustment to the current eye position of the user is achieved by an electronic shifting of the scanned image content on the matrix screen; with a mechanical and therefore rather expensive and delayed tracking, the tracking is done by a relative movement of screen and/or separating raster in relation to the viewer (cf. for example DE 102 46 941 A1). It is inherent in the methods with asymmetrical image resolution that either a part of the originally available image information is not used for the representation on the matrix screen or that intermediate pixels must be interpolated in the direction to the higher resolution. For example according to DE 102 46 941 A1, every second image column of the left and right stereo half-image is left out for matrix screens, which causes disturbing scan-effects.

The nearest prior art that this invention uses as a starting point is described in Publication III of K. Mashitani et al.: "Step barrier system multi-view glass-less 3-D display" (SPIE-IS&T Vol 5291, 2004, pp. 265-268). For the parallax view with a plurality of individual views, for example four or seven, there is described a "thinning-out method" (cf. FIG. 6 ibid.), wherein, for four image views, a subpixel from every pixel of an image view is selected and taken over into the current subpixel extract, maintaining its address. However, the loss of resolution is accordingly high. In a "loss-free" method, all pixels are taken over into the current subpixel extract, but most of the pixels are readdressed (cf. FIG. 7 ibid.), which requires high computing capacity. The subpixels are arranged obliquely with an offset of one subpixel each over three scanning lines along a stepped barrier raster the overall width of which in individual steps for example covers four or seven subpixels and by which the respectively newly sorted subpixels are optically joined together again into one pixel for the viewer. Taking into account all subpixels, however, there is required a not commercially available, cost-intensive screen with a very high pixel number (cf. FIG. 8 ibid.). In a hybrid method of both methods, there is made an attempt to find a compromise between the advantages and disadvantages of both methods (cf. FIG. 9 ibid.). However, in both methods, there is always selected the same number of subpixels from a pixel and taken over into the subpixel extract, which results in a systematic error. Due to the used multi-view method offering different individual perspectives, there is moreover not used a tracking procedure for image tracking. That way, several viewers may be present, but an individual viewer will not receive a stable undistorted individual perspective according to his/her natural head movements as it would be required for medical applications for example.

Problem and Solution

It is the problem to be solved by the invention to provide a method of the above-described generic kind that, taking into account the basic aspect of increasing the comfort for the viewer/s, can autostereoscopically produce a three-dimensional information with the highest possible resolution that has an approximately symmetric image resolution in horizontal and vertical directions. In that connection, quality-reducing effects, such as crosstalk, shading by separating lines between the pixels and electronic components and jumps, shall be avoided to a large extent and the method shall be carried out in a fault-tolerant manner. Moreover, the method shall allow for an autostereoscopic image reproduction for the individual viewer with sufficient margin for movements of the head. The optical tracking of the image output for the left and the right eye of the viewer shall be floating, without perceivable switching-effects, without need for a mechanical movement of components of an arrangement implementing the method. The arrangement itself shall use commercially-available components, in particular a commercially available matrix screen of landscape format, and shall be easy to operate, not susceptible to failure and cost-effective.

The solution to that problem according to the invention can be gathered from the following summary.

In the method according to the invention (in the following briefly referred to as "Multiplex-Track-Method"—MTV), a coloured subpixel extract of a stereoscopic view is generated from two discrete image views (right and left image view) on a commercially available matrix screen in landscape format and is electronically tracked for at least one viewer. For that purpose, the addresses of the subpixels of the right image view are stored in a right memory and the addresses of the subpixels of the left image view are stored in a left memory first. Then, the current eye position of the viewer is determined. Depending on that determined current eye position, a current subpixel extract is formed and displayed on the matrix screen. It is an essential feature of that subpixel extract that all subpixels included have maintained their original address from the R- or L-memory. That way, computing capacity and computing time for each subpixel extract can be considerably reduced. Moreover, every subpixel is at its correct content-related place from the individual view so that an image reproduction true to the original can also be ensured under the scanning required for autostereoscopy. The multiplex scheme of the formation of the subpixel extract consists of the progressive scanning-line arrangement of two (or three) neighbouring subpixels from the right image view directly and continuously beside two (or three) neighbouring subpixels from the left image view. Between the individual scanning lines, there is always observed an offset by one subpixel so that there results a subpixel overlapping of one (or two) subpixels for the same eye between neighbouring scanning lines and a crosstalk between both image views is reduced. The offset is oriented along the inclination of the separating raster so that always two pixel pairs are arranged under a separating element. The arrangement of two or three adjacent subpixels from an image view depends on whether the individual separating element covers four subpixels (in which case subpixel pairs from equal image views are arranged side by side and the obliquely extending covering between subpixel pairs from the same image view adjacent in scanning lines has a width of one subpixel) or six subpixels (in which case subpixel triples from equal image views are arranged side by side and the obliquely extending covering between subpixel triples from the same image view adjacent in scanning lines has a width of two subpixels).

The writing of the subpixel addresses into the current subpixel extract according to the multiplex scheme depends on the determined current eye position of the viewer. In its normal (nominal) position, the assignment preferably starts directly on the top left subpixel of the matrix screen. Due to the spatial L-R-aligned assignment of the subpixels to the viewer's eyes, there is started with the first two (or three) subpixels from the right memory. There follow two (or three) subpixels from the left memory that are stored there in the first scanning line on places 3 and 4 (or 4, 5 and 6) and the entire scanning line is accordingly assigned in an alternating manner in the right and left memory, maintaining the original subpixel addressing. Due to said address-maintaining, in case of subpixel pairs, there are alternatingly selected one or two subpixels from an original pixel, i.e. the selection is made asymmetrically. From the prior art, there is exclusively known a symmetrical selection (the same number of subpixels is selected from every pixel), which leads to systematic errors. In the invention, that system is broken so that the systematic error is significantly reduced. Moreover there is alternated, under a separating element covering four subpixels, between an assignment of three subpixels from the one memory and one subpixel from the other one and two subpixels from each memory, which leads to a further reduction of the systematic error. In case of a covering of six subpixels by a separating element, the assignment for the normal original position of the viewer is symmetrical. A complete pixel from the R memory and one from the L memory are alternatingly written. But already with a lateral offset of one subpixel due to a lateral movement of the viewer's head, an alternating asymmetry of the subpixel selection occurs here as well.

Depending on a lateral or vertical movement of the viewer, the subpixel extract is updated subpixel by subpixel. Since the subpixel assignment on the matrix screen is fixed (division into red, green and blue image gaps), it is necessary, maintaining the address, to select other subpixels of the fitting colour from the two image views when the viewer looks at the screen and therefore at other subpixels of other colours from a changed position. Depending on the viewer's movement, the writing of the current subpixel extract then starts on the second, third or fourth subpixel of the top scanning line of the matrix screen. If the viewer looks at the screen even more from the side, the representation switches back to the first subpixel and starts from the beginning. Individual subpixels in the edge region of the matrix screen are filled up according to the multiplex scheme or remain unassigned since they cannot be seen by the viewer anyway. Further explanations of the structure of the current subpixel extract can be gathered from the specific part of the description.

The MTV is based on the objective to make use of the basic advantages of the inclined position of the separating raster (resolution as symmetrically as possible in both image directions, blurring of interferences by regular, visible structures on the matrix screen) and of the introduction of an image reserve (more freedom of movement of the viewer without crosstalk, tolerance to errors of the method for determining the eye position) in connection with the advantage of the higher image resolution of a two-channel stereo method. The reduction of the resolution of the two image views to half the resolution of the matrix screen that is required for the MTV, too, however, has an effect on the subpixels only. That way, the visibility of interferences caused by scanning-effects can be clearly reduced. Unlike in the stereo method known from prior art, the MTV uses, in tracking the viewing areas, position-related new subpixel extracts from the composition of the two partial stereo images. The MTV ensures that the two image views available in the resolution of the matrix screen are represented on its subpixel raster with a symmetrical resolution. The crosstalk of the individual views known from the inclination of the separating raster in multiview systems is avoided by that special subpixel arrangement and by the design of the separating raster.

In summary, the special advantages of the MTV according to the invention are as follows:

- applicable in the usual landscape screen format with a nearly symmetrical stereoscopic image resolution in horizontal and vertical directions;
- almost floating, fully electronic tracking of the image content depending on the current position of the viewer (no visible switching-over with intermediate shadow zone as in an orthogonal arrangement of the separating raster, no mechanically moved parts);
- less restrictions in the use of modern LCD displays with conductor tracks, transistors and other visible structures within the pixel aperture (as in wide-angle LCD displays with Multi-Domain Vertical Alignment), therefore investment security in modifications of the subpixel structure of the matrix screen;
- reduced crosstalk in the obliquely extending separating raster due to buffer areas with image reserve (always two or three adjacent horizontal subpixels are used for one image perspective).

In a special form of execution of the MTV, there can be used a subpixel multiplex scheme that is technically very easy to realise and is very favourable with regard to the requirements on electronic tracking. For avoiding repetitions, reference is made to the specific part of the description.

Another essential feature of the MTV is the electronic tracking of the current autostereoscopic image information to the current position of the viewer's eyes. The current eye position can be advantageously determined by involving a preferably video-based tracking procedure for finding the head or eye details of the at least one viewer. Tracking procedures are generally known and reliably developed. They are able to work without further strain on the viewer, such as e.g. by markings on the viewer's head, and that way will not reduce the user comfort. On the contrary, they increase it because the electronic tracking in the MTV allows the viewer to move the head without leaving the stereoscopic area of an image perspective. Video-based tracking procedures work with video cameras for capturing the current head or eye details that are analysed accordingly. With video cameras, it is also possible to capture the two separate image views for the right and the left eye of the viewer. Other tracking procedures without video capturing of the viewer are technically mature and usable, too. In the tracking procedure, it is of advantage to dynamically change the capturing setting for the image views depending on the current eye position determined by the tracking method. Apart from an autostereoscopic representation of static image scenes, it is also possible to represent autostereoscopic moving images. For that purpose, a dynamic storage of the image views is of advantage. Standard video formats can be used and analysed for addressing the subpixels. Furthermore, an automatic adaptation of the image views to the resolution of the matrix screen is of advantage (format conversion) as it is for example integrated in the software of customary computer operating systems.

Moreover, it is possible, by means of a adjustable distance of the separating raster to the matrix screen, to change the representation geometry of the scanning and thereby the size of the stereoscopic areas and that way respond to changes in depth of the distance of the viewer to the screen. Electronic tracking can only compensate for lateral and vertical changes in the eye position. Changes in the representation can also be made e.g. by addressing the separating raster for activating or blocking the individual separating elements. That way, the separating raster can be switched off in part or fully. In case it is completely switched off, only monoscopic image information can be represented on the screen. But there can also be switched off certain areas while other ones are maintained so that there results a hybrid screen that shows monoscopic as well as stereoscopic image information. But it is for example also possible to switch off every second raster column so that the distance between the individual separating elements is doubled. By such a measure, there can be selected for example a different viewing mode as described below.

A modification of the MTV provides for a division of the right image view into a first right and a second right image view and a division of the left image view into a first left and a second left image view, a storage of the addresses of the subpixels of the first and second right image views in a first and second right memory and of the first and second left image views in a first and second left memory, a formation of the current subpixel extract by a progressive arrangement alternatingly line by line of two adjacent subpixels of both right or both left image views and an involvement of a tracking procedure for detecting the head or eye details of two viewers, assigning to each viewer a right and a left image view, respectively. With that modification, the essential advantages of the MTV, in particular the reduced crosstalk in the obliquely arranged separating raster and the maintenance of the original pixel addressing, are preserved and it becomes also possible to provide two viewers simultaneously with an autostereoscopic information each—however with an again halved resolution and increased crosstalk. For that purpose, two left and two right partial stereo images are stored in respective memory means. Now the subpixel pairs are not selected from one and the same partial stereo image anymore, but from two closely adjacent ones so that the reserve function of multiple subpixel selection is maintained and the effect of crosstalk is reduced. Also with this modification, the individual autostereoscopic image contents are tracked in relation to the respective viewer. Thus, two tracking systems are used both of which access the same screen so that two viewers receive simultaneously a similar (or equal when the two stereoscopic views are simply doubled) autostereoscopic image information also when moving their heads. The same applies analogously to three viewers with three tracking systems when three right and three left image views are stored. In that case, however, the image resolution is divided by three compared with a use by one viewer.

Such a division among two or three viewers is suitable when they are at a medium distance to the screen. For a viewer at a short distance to the screen, there should be used the highest possible resolution and therefore only provided one right and one left image view in a single perspective. Since, however, the number of viewers and their distance to the screen may change, it is of advantage when the tracking procedure can be switched over, either manually or automatically, between a tracking of one, two or three viewers depending on the distance of the front viewer to the matrix screen. Finally, there may be provided an additional mode for a tracking-free multiview representation from N image views as it is known from prior art. That mode can be sensibly chosen when a large number of viewers is present at a larger distance to the screen. When the separating elements are switchable, for example eight neighbouring image views can be combined into seven different view perspectives as parallax view. Advantageously, it will be possible, depending on the number of viewers and their distance to the screen, to switch over between the tracked stereoscopic view for one, two or three viewers or the untracked multiple view for more than three viewers depending on the distance of the front viewer to the screen. Further switching possibilities comprise the switching over to a monoscopic image content or to a hybrid image content with stereoscopic and monoscopic view areas.

The MTV is relatively easy to realize with commercially available components. Preferably, there may be used an arrangement with a matrix screen having colour-assigned subpixels in scanning lines and an optical separating raster, wherein the periodicity of the separating elements in horizontal direction corresponds to a) four or b) six subpixels and wherein the separating elements are arranged obliquely in relation to the matrix of the screen with an inclination corresponding to the small side ratio of the subpixels. Moreover, there are provided at least a right memory and a left memory as well as a multiplex memory for storing the currently formed subpixel extract, a data processing unit for forming the current subpixel extract and for controlling the process flow and the individual components of the arrangement and at least one preferably video-based tracking system for detecting head or eye details of a viewer. According to the viewing mode, there may also be provided, subject to the number and distance of the viewers, two or three tracking systems for detecting head or eye details of two or three viewers. If they do not only move laterally and horizontally, but also in their distance to the screen, it is of advantage when the separating raster is variable in its distance to the screen or removable. The change of the distance can be made manually or electrically, individually or automatically. Removing the separating raster allows for a normal two-dimensional viewing mode on the conventional matrix screen. In the separating raster, the separating elements may have the form of slots or stripes (barriers) or prisms, cylindrical lenses, however, being preferred. Thus, the separating raster is preferably designed as a lenticular raster with obliquely arranged cylindrical lenses as separating elements. Such a separating raster is easy to manufacture and provides for a constantly high optical reproduction quality.

An even more fine-stepped tracking is possible when an addressable separating raster having alternative separating-element combinations offset by half a subpixel in relation to the subpixel raster of the matrix screen is used. For such sub-subpixel tracking, there is advantageously used alternating addressing between the separating elements in the defined periodicity and further separating elements with the same periodicity laterally offset from the defined periodicity by half the width of a subpixel. For that purpose, it is of advantage to use a separating raster with separating stripes the activation of the separating elements of which is addressable, wherein the individual separating stripes are arranged in two groups having the same periodicities with an offset of half the width of a subpixel to one another. Both, a mechanical and an electronic sub-subpixel tracking can be realised, the latter being preferable in the technical development. The stripes can opened and closed merely electronically. A mechanical shifting of two stripe plates arranged on top of one another, however, is possible, too.

The rectangular form of the subpixels is an idealised description. In practice, the subpixels often deviate from that form with areas in the corners being covered. That way, the areas where control elements are integrated are covered up. By a skilful rearrangement of these areas, the crosstalk in the subsequent view can be reduced. Especially with a bevelling of the subpixels on both sides, an optimum adjustment of the subpixels to the oblique separating raster is achieved and that way the crosstalk is reduced.

BRIEF DESCRIPTION OF THE DRAWINGS

The Multiplex Track Method MTV and a preferred arrangement for its implementation according to the invention are explained below in more detail for their further understanding on the basis of the schematic figures. In respective image details, the figures show the following:

FIG. 10 an addressable separating raster for single- and multiple-user utilisation;

FIG. 11 a bevelled subpixel design.

DESCRIPTION OF PREFERRED EMBODIMENTS

Figure 1:
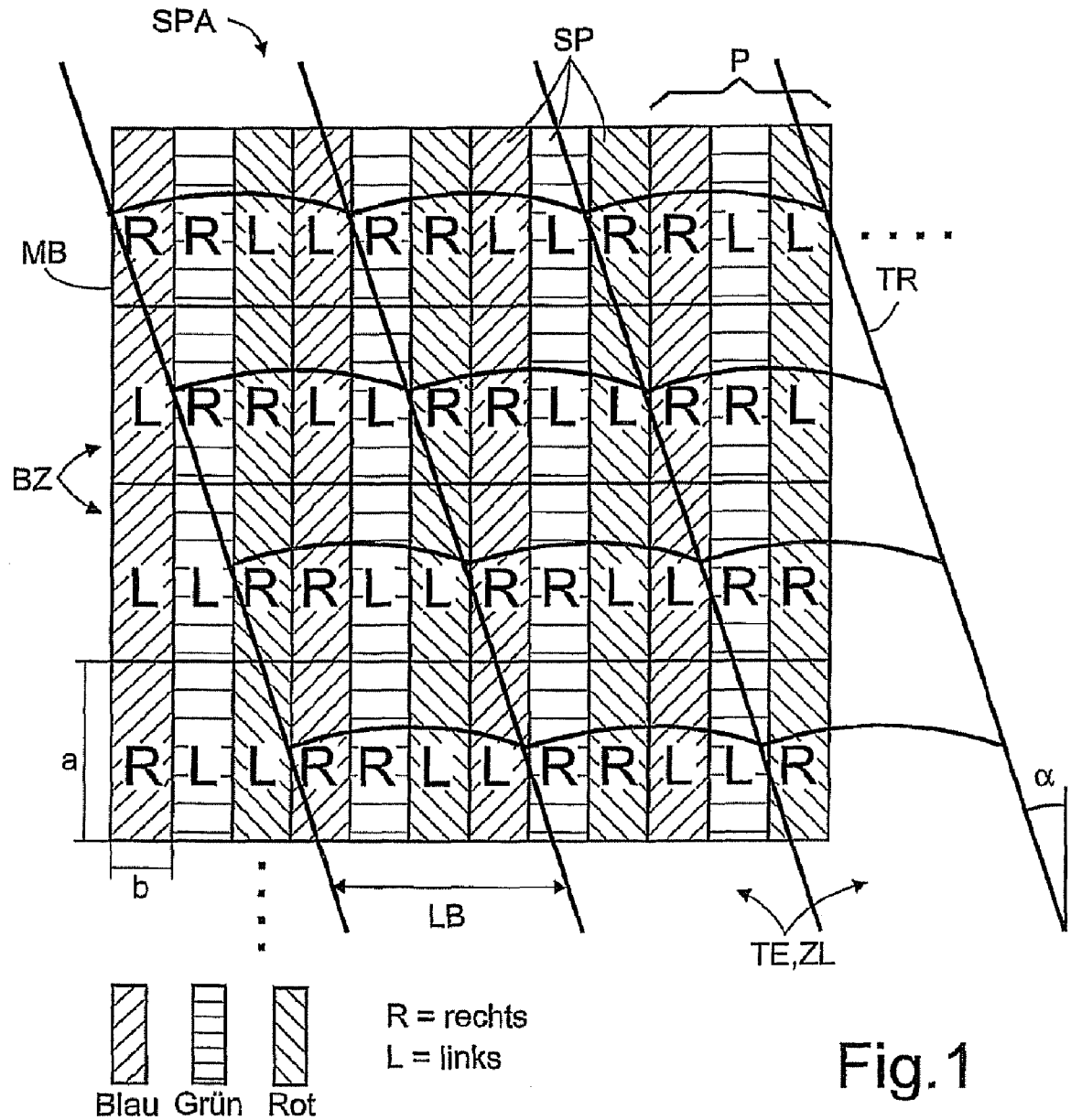
FIG. 1 a subpixel extract for a perpendicular (nominal) viewing angle.

As an exemplary embodiment of the MTV (Multiplex Track Method), FIG. 1 schematically shows a detail of a matrix screen MB covered with a scanned subpixel extract SPA for the reproduction of autostereoscopic information. On the matrix screen MB (LCD, plasma display), there are simultaneously reproduced, in a scanned manner, a left (L) and a right (R) image view (stereoscopic view, stereo semi-image), which means the views for the left an the right eye of the viewer, respectively. The matrix screen MB has vertical colour stripes of blue subpixels SP (in FIG. 1 shown hatched ascending to the right), green subpixels SP (in FIG. 1 shown horizontally hatched) and red subpixels SP (in FIG. 1 shown hatched descending to the right). The subpixels SP are arranged in horizontal scanning lines BZ. A pixel P of an image information is composed of a blue, a green and a red subpixel SP. The colour value of the pixel P results from the superimposition of the intensities of the three subpixels SP (colour mixing takes place in the viewer's eye). In the separating raster TR arranged obliquely in relation to the matrix of the matrix screen MB, respective colour subpixels SP along the inclination belong to one pixel P. The assignment of the subpixels SP from both image views L, R in the scanned image view on the matrix screen MB is described by a multiplex scheme $MUX_i$. A separating raster TR placed in front of the matrix screen MB is fixed in a position turned by an angle α in relation to the vertical axis of the matrix screen MB (Slanted Raster Principle). The angle is calculated as α=arctg b/a, b being the narrow side and a the broad side of a subpixel SP. Thus, the (negative) slope of the separating raster TR corresponds to the small side ratio of the subpixels SP. With a ratio of b:a=1:3, there results an angle α of 18.43° for the inclination of the separating raster TR. In the exemplary embodiment shown, the separating raster TR has cylindrical lenses ZL as separating elements TE. The lens width LB (pitch) is chosen in such a manner that a cylindrical lens ZL has about the width of four subpixels SP in horizontal direction. A covering of six subpixels SP by a separating element TE is also possible, the lens width LB being respectively larger in that case, the slope of the separating raster TR does not change.

Figure 2:
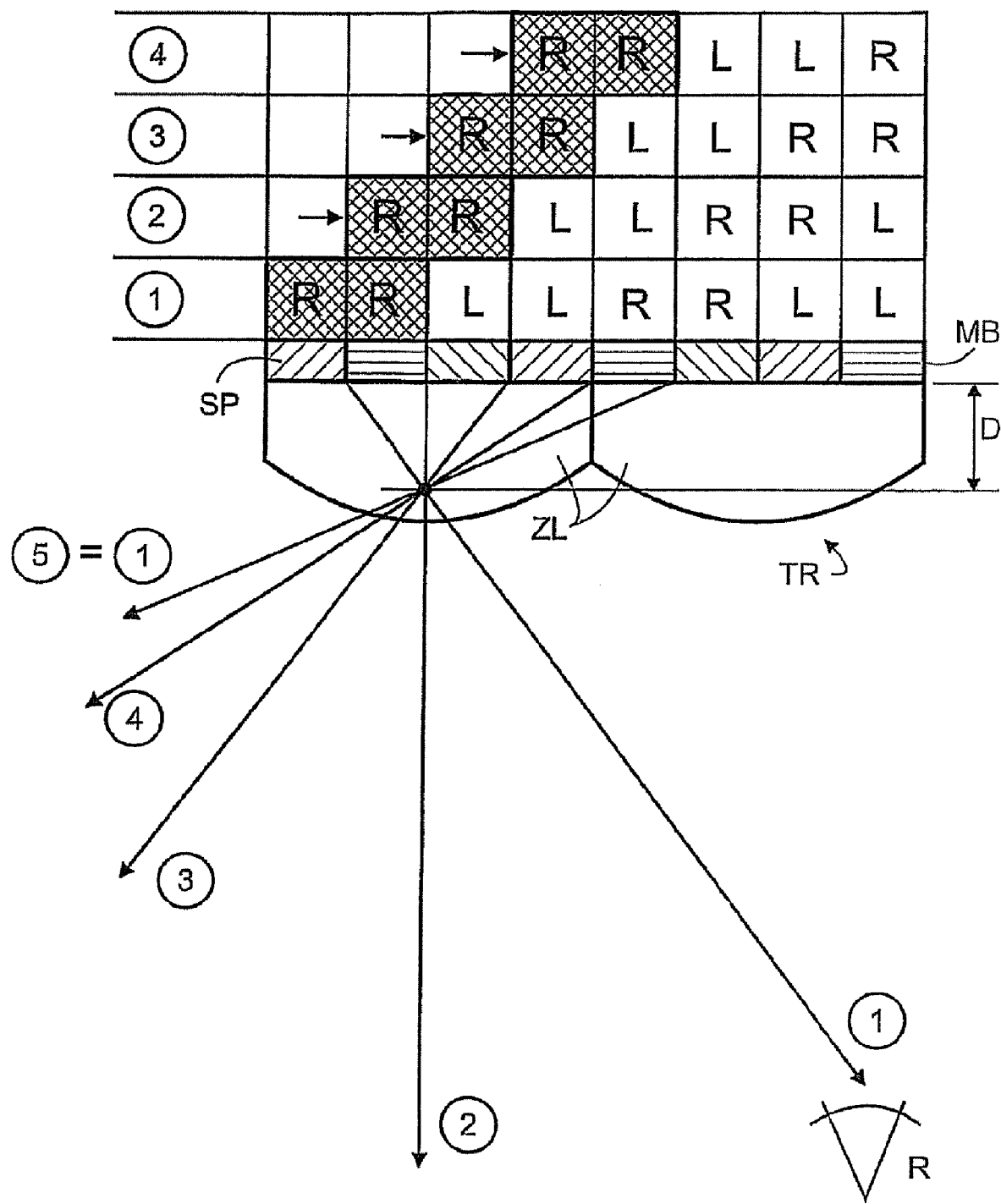
FIG. 2 the change of the subpixel extract for a variable viewing angle.

For the optical addressing of the two eyes of a viewer, a tracking procedure is used. Upon movements of the viewer's head, the viewing areas for the left and the right eye is tracked by a respective selection or adjustment of the multiplex scheme $MUX_i$ (electronic tracking). FIG. 2 exemplarily shows the lateral shifting of the image content on the matrix screen MB for the right eye R of the viewer when the latter moves out of the nominal normal position (1) to the positions (2), (3), (4) or (5), wherein position (5) again corresponds to position (1). One can see the lateral change of the image content by one subpixel SP each time to other subpixels SP of respective other colours so that other subpixels SP must be respectively selected from the two image views L, R for the subpixel extract SPA in order to track the image content correctly according to the eye movement.

Figure 3A:
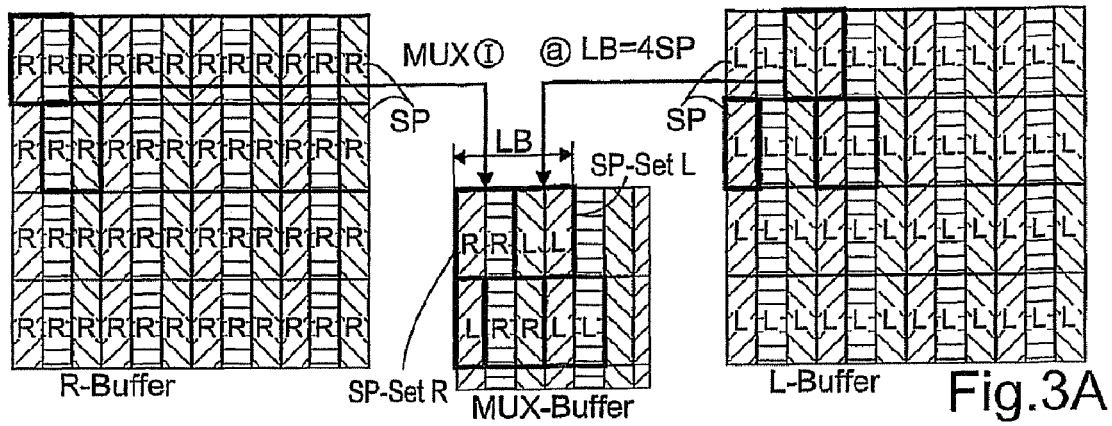
FIGS. 3A to 3D four multiplex schemes for 4 subpixels behind a separating element.
Figure 3B:
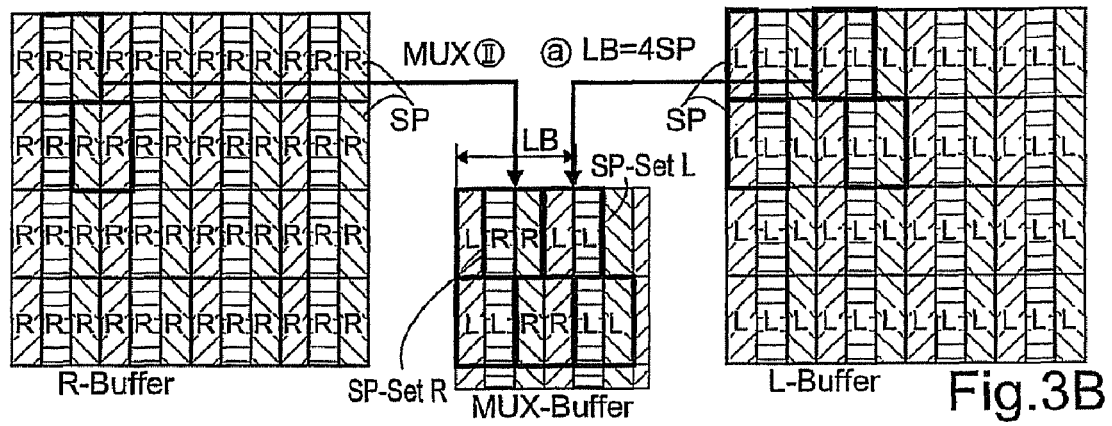
Figure 3C:
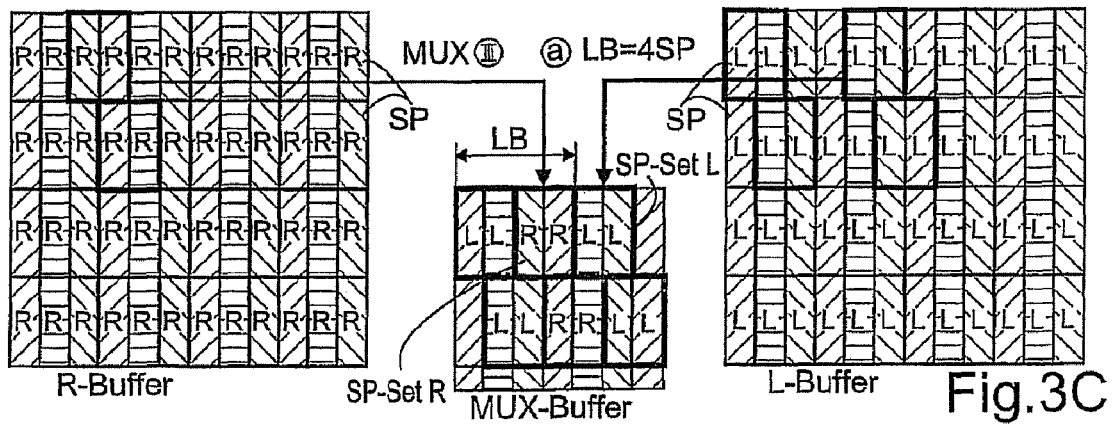
Figure 3D:
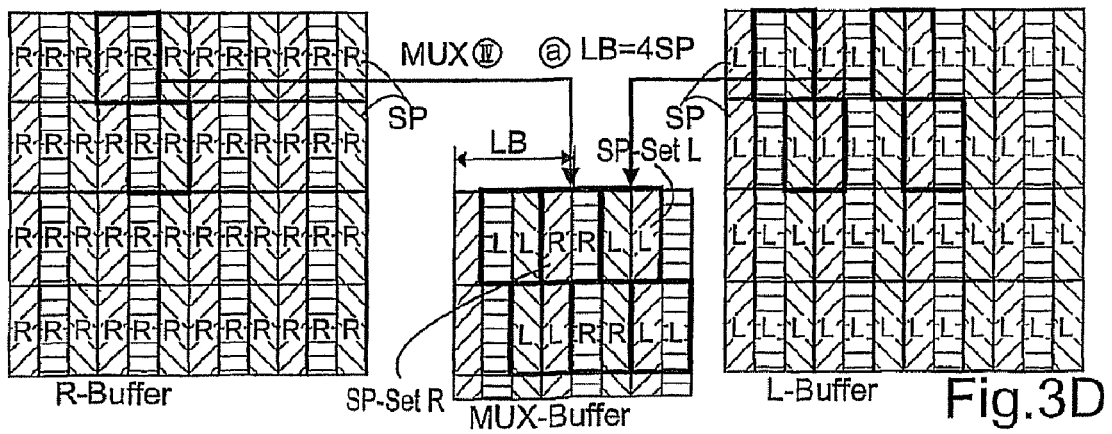
Figure 4A:
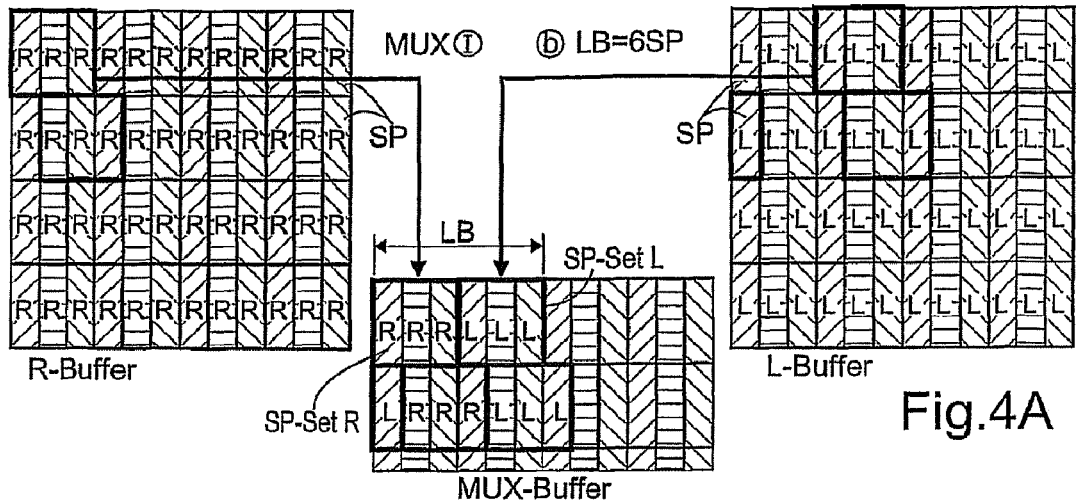
FIGS. 4A to 4F six multiplex schemes for 6 subpixels behind a separating element.
Figure 4B:
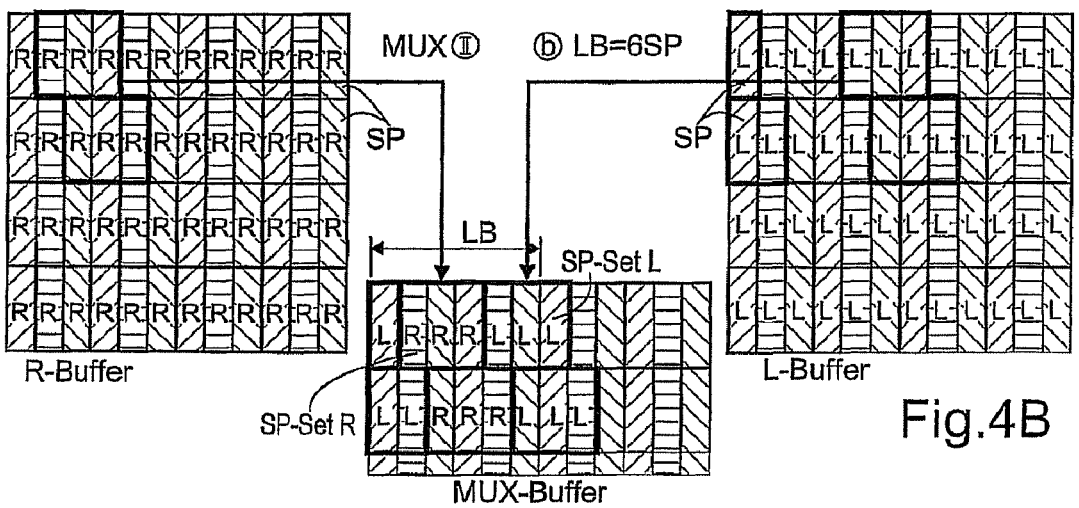
Figure 4C:
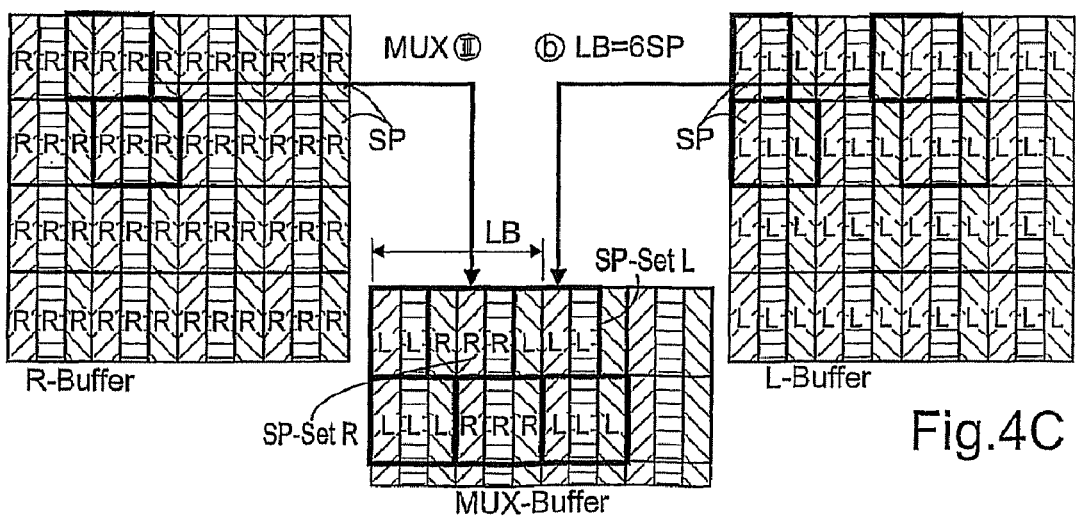
Figure 4D:
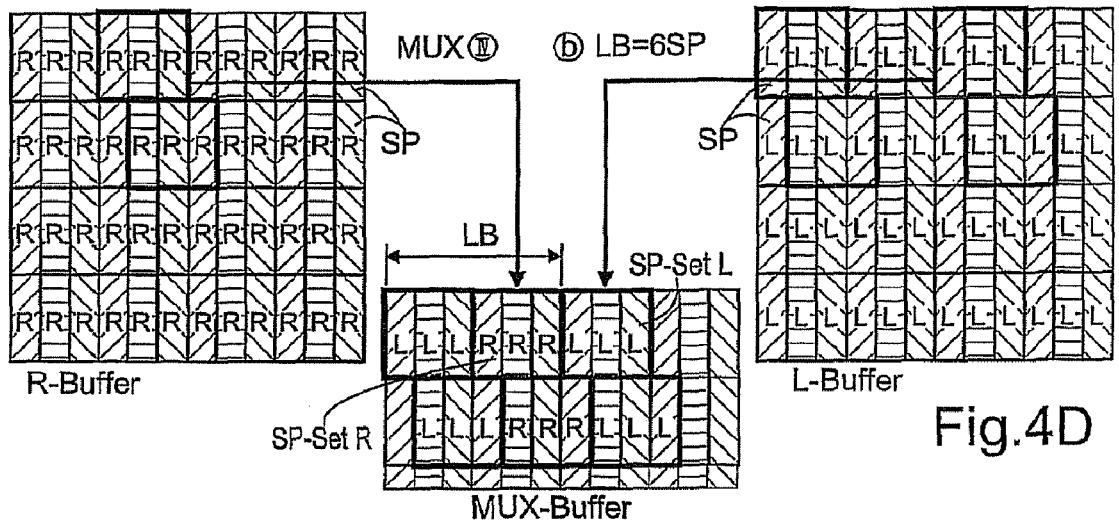
Figure 4E:
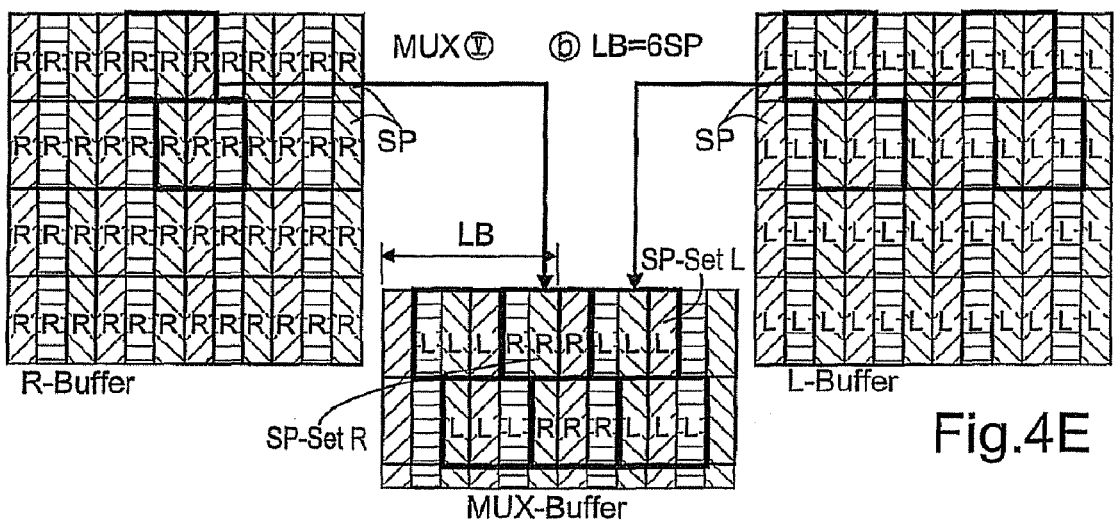
Figure 4F:
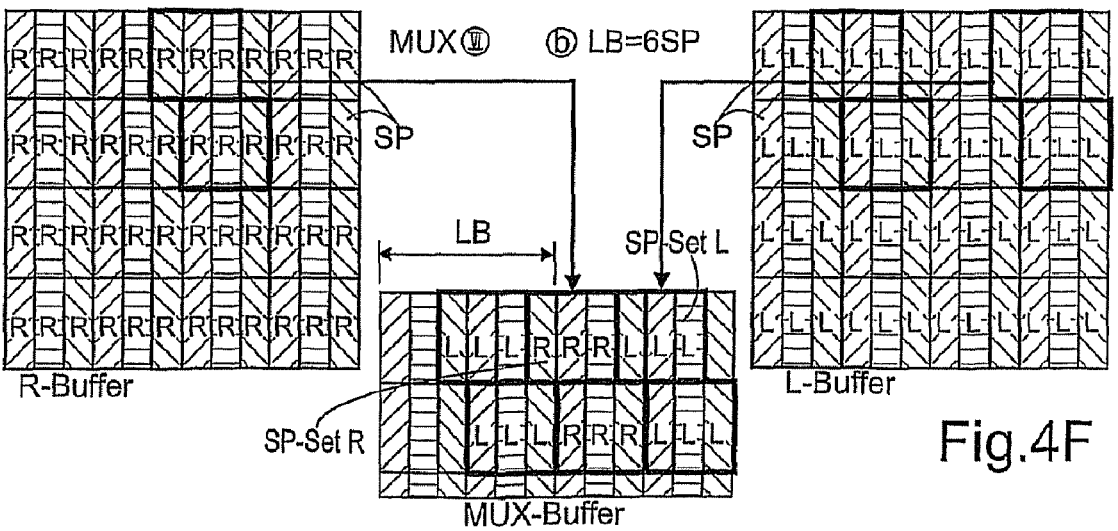

In the nominal normal view of the viewer (perpendicular to the screen surface, see FIG. 1), always two horizontally adjacent subpixels SP belong to the same left or right image view (L or R). The pairs of two subpixels SP from the left image view LL and two right subpixels SP from the right image view RR are alternatingly continued line by line and that way the entire matrix screen MB is filled. Due to the distance D between the separating raster TR and the matrix screen MB (cf. FIG. 2), there results a parallax effect: with a respective dimensioning of the matrix screen MB with the separating raster TR placed before it, the viewer, depending on the current position of his/her head, sees with the left eye L essentially a certain selection of the subpixels SP of the matrix screen MB (SP-Set L, cf. FIGS. 3A and 4A, for reference not explained see FIG. 1) and with the right eye R essentially sees a certain selection of the remaining subpixels SP (SP-Set R, cf. FIGS. 3A and 4A). For bringing about the stereoscopic effect, the subpixels SP of the left and right stereoscopic views L, R are assigned to the respective subpixel sets (SP-Set L, SP-Set R) by an image multiplexer, the addresses of the subpixels SP remaining unchanged. Since the screen coordinates of the two subpixel sets (SP-Set L, SP-Set R) depend on the current eye position (more exactly: the 3D coordinates of both pupils) of the viewer in relation to the screen, the application of a tracking procedure is required. In the following it is assumed by way of simplification that the arrangement of matrix screen MB and separating raster TR shall be designed for a fixed nominal viewing distance of the viewer; i.e. an adjustment of the addressing of the subpixels SP is only made depending on the horizontal and vertical movements of the viewer's head. Such simplification is admissible because the viewing areas have an extension also in direction towards the matrix screen MB that is sufficient for practical applications. The viewing areas for the autostereoscopic MTV described here are rhomb-shaped areas with maximum horizontal and vertical extensions at the place of the nominal viewing distance.

Embodiment of Subpixel Multiplexing

In the following, the multiplexing is described for the exemplary raster arrangement shown in FIG. 1. In a specific embodiment of the Multiplex Track Method MTV, there can be used a subpixel multiplex scheme that is technically very easy to realise and supports the requirements on electronic tracking very well. It is assumed that the two image views exist in the form of two prefabricated bitmaps (e.g. image pair of a stereoscopic camera) or may be generated by a special computer program depending on the viewer's perspective. As long as conventional user interfaces (API), such as Open GL or DirectX do not allow for direct access to the addressing of the subpixels of a graphics adapter, a modified hardware-specific graphics driver is required for subpixel multiplexing.

It is further assumed that the bitmaps of both image views are kept as a whole or in part in two memory means, the left memory L-Buffer and the right memory R-Buffer. The multiplex software reads individual subpixels SP or pairs of adjacent subpixels SP at certain addresses out of the two memory means L-Buffer, R-Buffer and writes the video values under the corresponding addresses into a multiplex memory MUX-Buffer. A special advantage of the MTV is based on the fact that only a maximum of four (in case of a separating element TE covering four subpixels SP) or six (in case of a separating element TE covering six subpixels SP) multiplex schemes need to be implemented in the driver software of the graphics adapter for addressing the multiplex memory MUX-Buffer depending on the horizontal and vertical viewer position (cf. FIGS. 3 and 4). Then, a respective driver software of the tracking system used only needs to select the required multiplex scheme MUX depending on the respective pupil position of the viewer (taking into account the optical and geometric parameters of the matrix screen MB and of the separating raster TR that are assumed to be known) and fill the matrix screen MB accordingly.

For forming the subpixel extract on the matrix screen MB, two different variants can be used. In the first variant, a) four or b) six different multiplex schemes $MUX_i$, starting with the first to the a) fourth or b) sixth subpixel SP in the first scanning line can be firmly defined in the multiplex software. Depending on the specific current eye position, the fitting multiplex scheme $MUX_i$ is accessed and the multiplex memory MUX-Buffer is respectively filled. There exist four (cf. FIGS. 3A to 3D) or six (cf. FIGS. 4A to 4F) different multiplex schemes $MUX_i$ because the viewer can look at each of the four or six subpixels SP under the separating element TE that then is quasi assigned as the "first" subpixel SP for the right eye R. The subpixels SP lying before the "first" subpixel SP up to the edge of the matrix screen MB are filled up in a respective alternating manner and show the difference in the different multiplex schemes $MUX_i$. In the course of FIGS. 3A to 3D or FIGS. 4A to 4F, respectively, the "first" subpixel SP for the right eye R jumps one subpixel SP to the right each time so that there do always occur different subpixel constellations in front of it. Only the fifth or seventh offset by one subpixel SP again shows exactly the first multiplex scheme MUX.

In the second variant that is not presented in detail in the figures, only three different multiplex schemes $MUX_i$, starting with the first, second or third subpixel SP in the first scanning line, and an integral pixel jump nP are defined, depending on the certain current eye position. The subpixel extract starting for the fourth (or seventh subpixel SP or the tenth subpixel SP etc.) subpixel SP for four subpixels SP under a separating element TE then results from the first multiplex scheme MUX shifted by an entire pixel P (or two pixels 2P for the seventh subpixel SP or three pixels 3P for the tenth subpixel SP etc.). Analogously, the subpixel extract for the fifth subpixel SP results from the second multiplex scheme MUX shifted by one pixel P and the subpixel extract for the sixth subpixel SP results from the third multiplex scheme MUX shifted by one pixel P. Then the assignment rule repeats itself with a pixel jump of 2P etc. For six subpixels SP under a separating element TE, there result analogous conditions, there are accordingly shifted the three first multiplex schemes $MUX_i$ by an integral pixel number nP.

The first variant involving a direct reading of the different multiplex schemes $MUX_i$ will always be applied advantageously when the image information to be reproduced is smaller than the matrix screen MB. Upon shifting the content, subpixels SP on the edge may remain unassigned because a viewing is not possible for the viewer there. The second variant can be advantageously used when the image to be reproduced is larger than the matrix screen MB. Also the shifted image will always fill the entire matrix screen MB completely.

Figure 5:
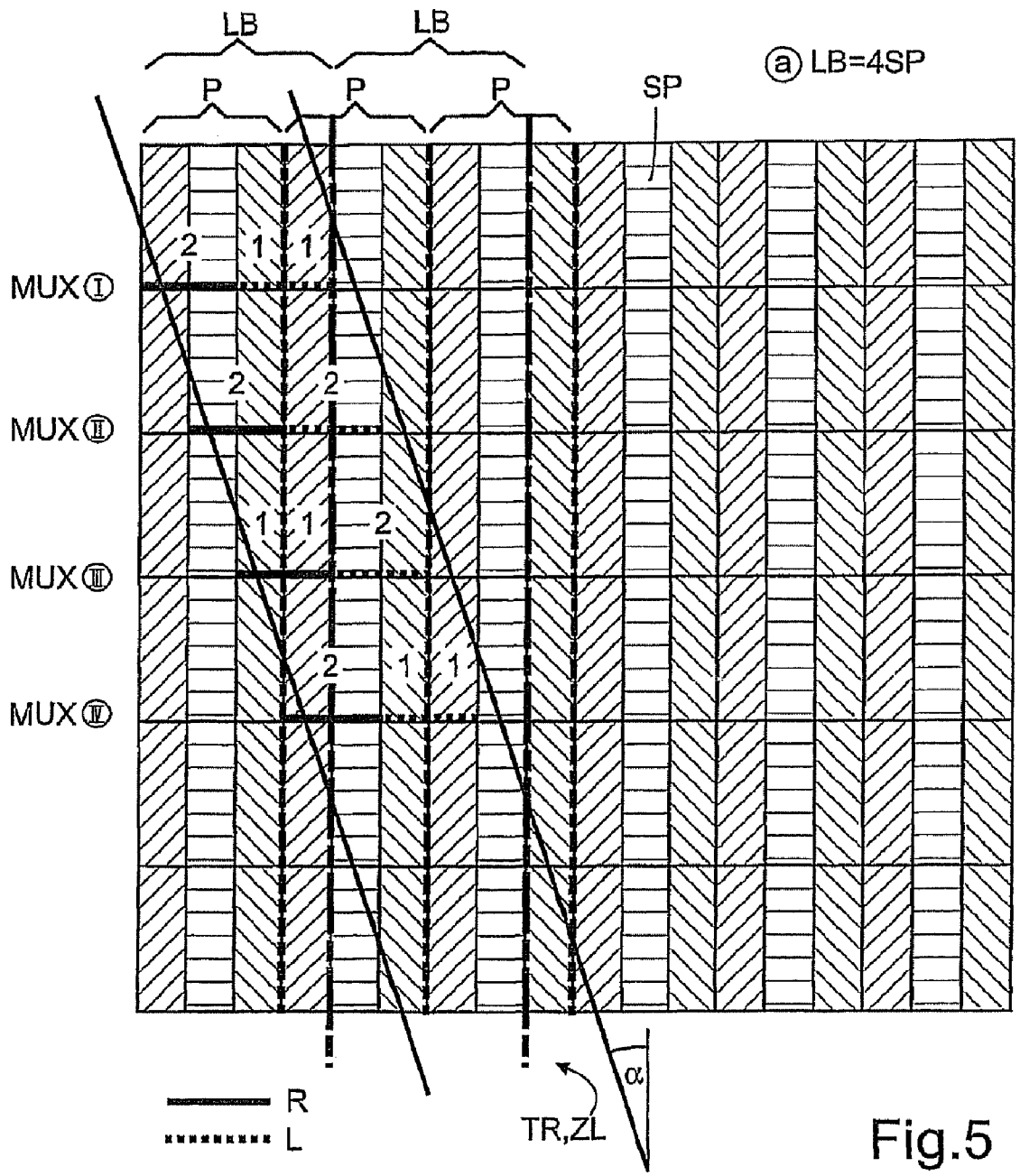
FIG. 5 the subpixel distribution for 4 subpixels behind a separating element.

The distribution of the subpixels SP in relation to the viewer's eye is shown in FIG. 5 for a cylindrical lenses ZL with four covered subpixels SP (variant a: LB=4SP). Moreover, the inclination of the cylindrical lens ZL by the angle α is shown; the horizontal pixel distribution with three subpixels SP red, green, blue each is indicated by the eye-assignment R, L. It is visible that every horizontal pixel P comprising three subpixels SP of different colours is always composed of two subpixels SP of the one and one subpixel SP of the other image view (numbers 2-1). Under the cylindrical lens ZL, there is moreover positioned one subpixel SP from the next left pixel P. It is visible that, from the pixels P of the two image views, alternatingly one or two subpixels SP are taken over into the subpixel extract SPA. Due to that alternating multiplex scheme MUX used in the MTV with an offset by one subpixel SP line by line resulting in an obliquely arranged covering of one subpixel SP, on the one hand, the subpixels SP along the obliquely arranged cylindrical lens ZL are optimally arranged so that there is no crosstalk and, on the other hand, they are combined into one pixel P in an colour-related optimum way so that the viewer does not perceive any jumps in the content even though the systematic error was considerably reduced by the mixing from different pixels P.

Figure 6:
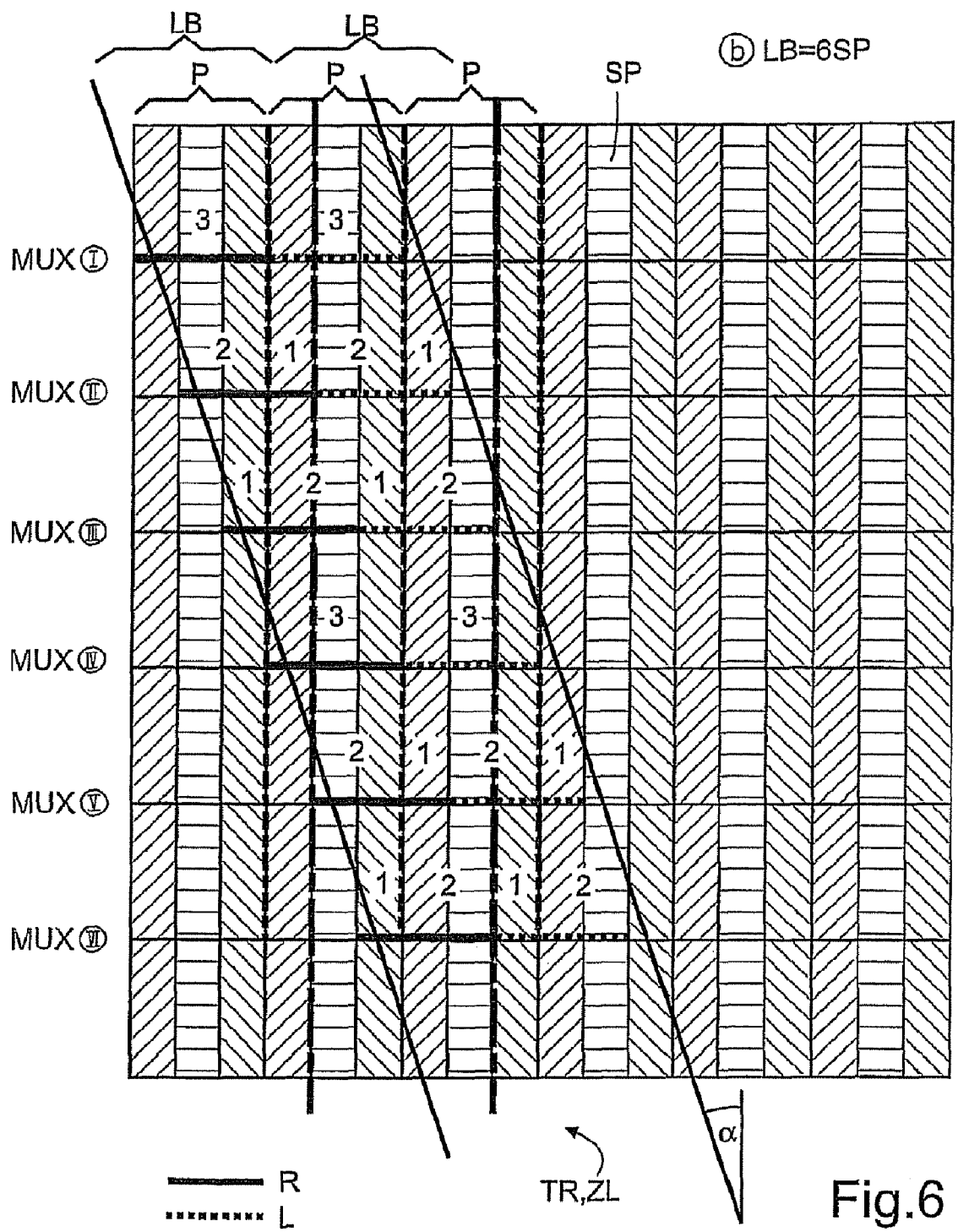
FIG. 6 the subpixel distribution for 6 subpixels behind a separating element.

FIG. 6 shows the analogous distribution of the subpixels SP for a cylindrical lens ZL covering six subpixels SP (variant b: LB=6SP). In the first multiplex scheme MUX I, the selection of three subpixels SP from one image view each corresponds to the pixels P under the cylindrical lens ZL (numbers 3-3). With an offset by one subpixel SP (multiplex scheme MUX II), the following asymmetric distribution is visible: two subpixels SP from the first right pixel P, one subpixel SP from the second right pixel P, two subpixels SP from the first left pixel P, one subpixel SP from the second left pixel P (numbers 2-1-2-1). This alternating sequence is changed between the image views in the following multiplex scheme MUX III (numbers 1-2-1-2). Also with an arrangement of six subpixels SP under a cylindrical lens ZL it is therefore guaranteed that, alternatingly, always three, two or one subpixel/s SP from the pixels P are/is taken over into the current subpixel extract SPA and the above-mentioned advantages are maintained.

Figure 7:
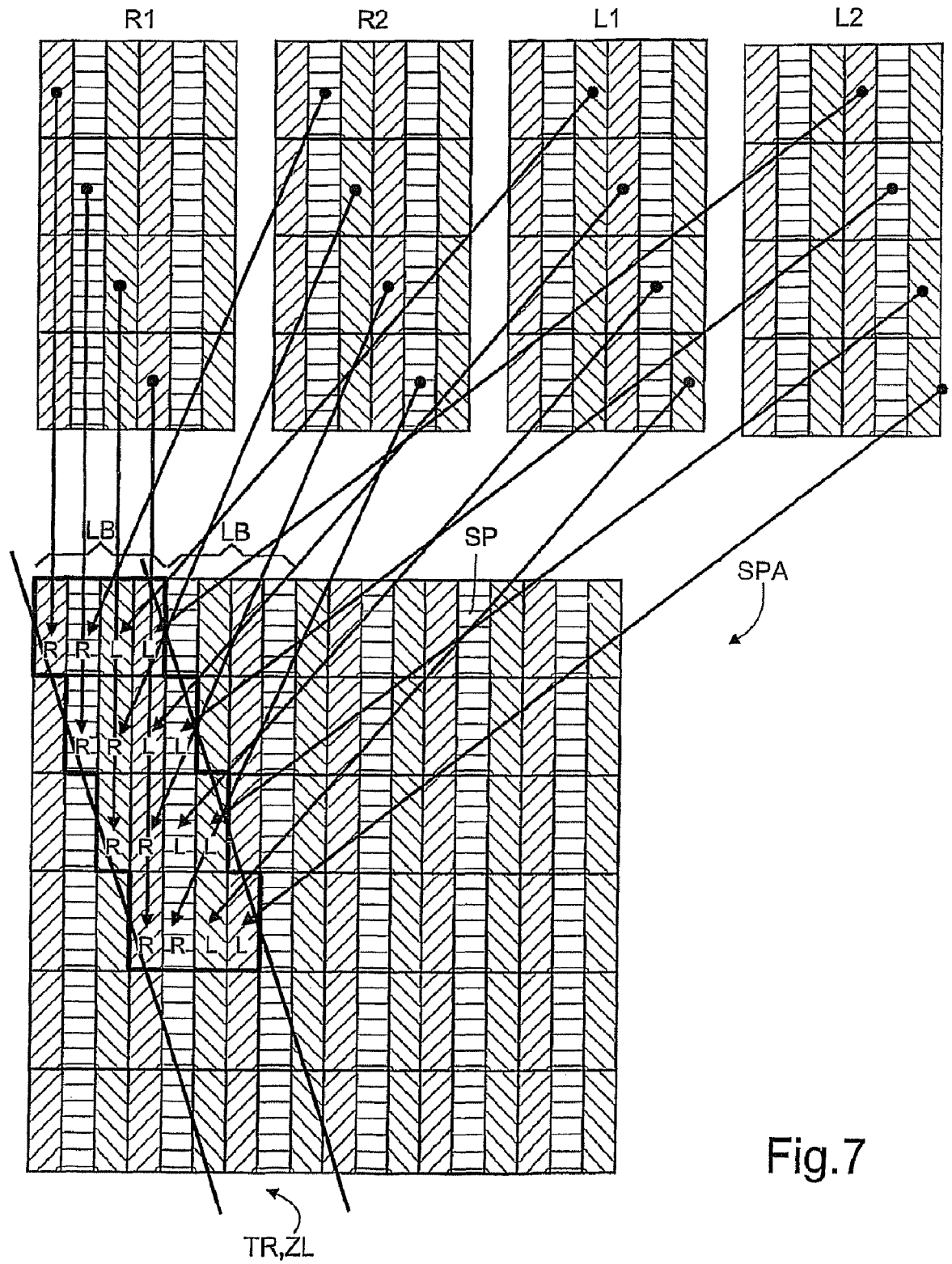
FIG. 7 a subpixel extract with several right and left image views.

FIG. 7 shows a subpixel extract SPA, when a first and a second right image view R1, R2 and a first and a second left image view L1, L2 are used, for the case of variant a) that four subpixels SP are located under a separating element TE. The application of the different multiplex schemes $MUX_i$ with an offset line by line by one subpixel SP along the obliquely arranged separating raster TR applies analogously, just like the maintenance of every subpixel address from the storage memory to the video memory. For two right and two left image views R1/R2, L1/L2, two right and two left memory means for pixel storage are provided accordingly. The formation of pairs of two right subpixels SP and their direct arrangement beside two left subpixels SP are maintained, too. In contrast to the use of only two image views R, L, in this variant, however, the two right or left subpixels SP do not come from the same image view R, L, but from two different even though very closely neighbouring right and left image views R1/R2, L1/L2. With that modification, either two or (in case of six subpixels SP under one separating element TE) three viewers can be simultaneously tracked and receive an individually tracked image perspective of two related right and left image views (R1/R2, L1/L2) respectively or, when the tracking is deactivated, more than two or three viewers can view different image perspectives without image tracking just like in a conventional multiview system. It is possible to switch over between the different modes as required. An analogous subdivision into three right and three left image views for variant b) with six subpixels under one separating element TE is possible, too. By means of three tracking systems, three viewers can be separately provided with a trackable individual perspective each. By using the subpixels SP from only one image view, there can be realized a locally restricted or full-area monoscopic image reproduction; maybe with a (local) deactivation of the separating raster TR.

Figure 8:
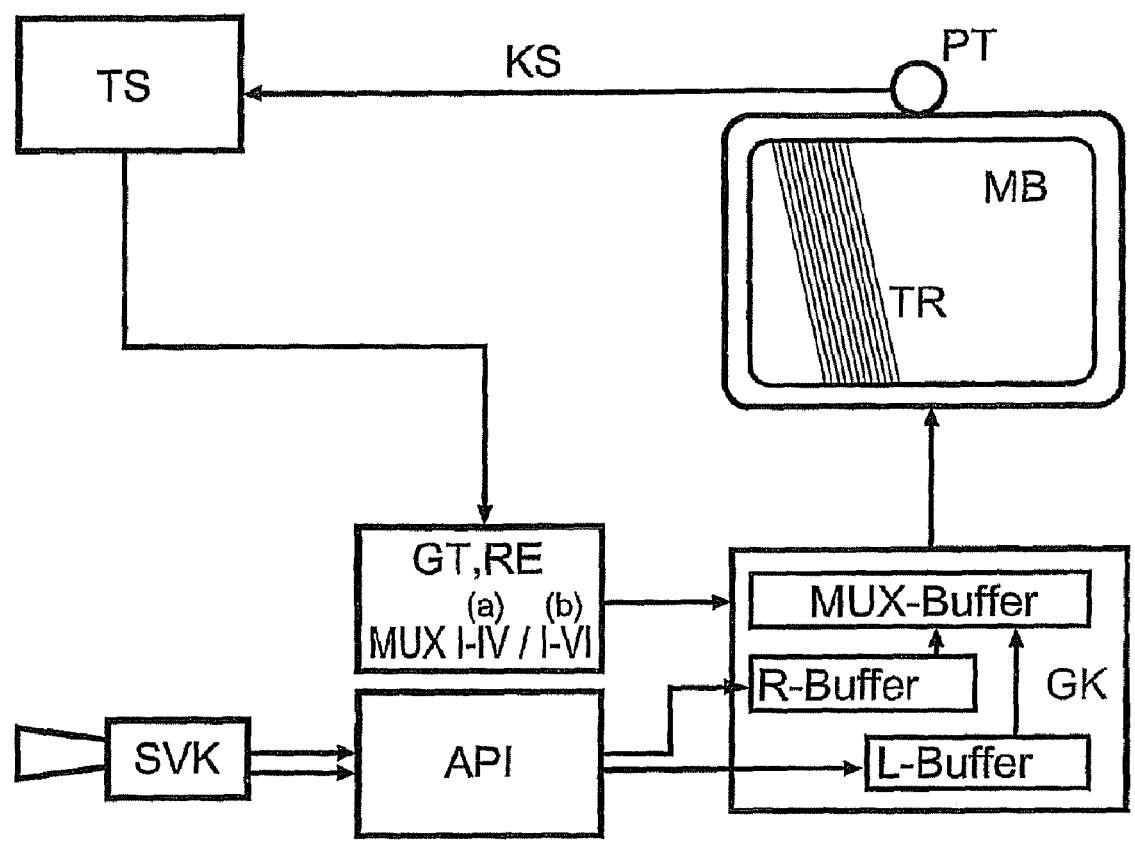
FIG. 8 a block diagram of an arrangement for implementing the MTV.

FIG. 8 shows a block diagram of an arrangement for implementing the MTV. A 3-D application captured for example with a stereo video camera SVK having a right image view R and a left image view L is loaded, via a conventional user interface API into a right memory R-Buffer and a left memory L-Buffer on a graphics adapter GK. By means of a preferably video-based tracking system TS for detecting head or eye details of a viewer, for example a pupil tracker PT, the current eye position of the viewer is determined. The tracking system TS is addressed depending on the currently reproduced camera signal KS. The different multiplex schemes MUX I-IV/VI are stored in the graphics software of the graphics driver GT. The graphics driver GT comprises a computing unit RE for controlling the process flow and for selecting the mode. Depending on the respective viewer position determined, a multiplex scheme $MUX_i$ is selected and the current subpixel extract SPA is created and stored in a multiplex memory MUX-Buffer. It is displayed on the matrix screen MB with a separating raster TR in front of it.

Figure 9:
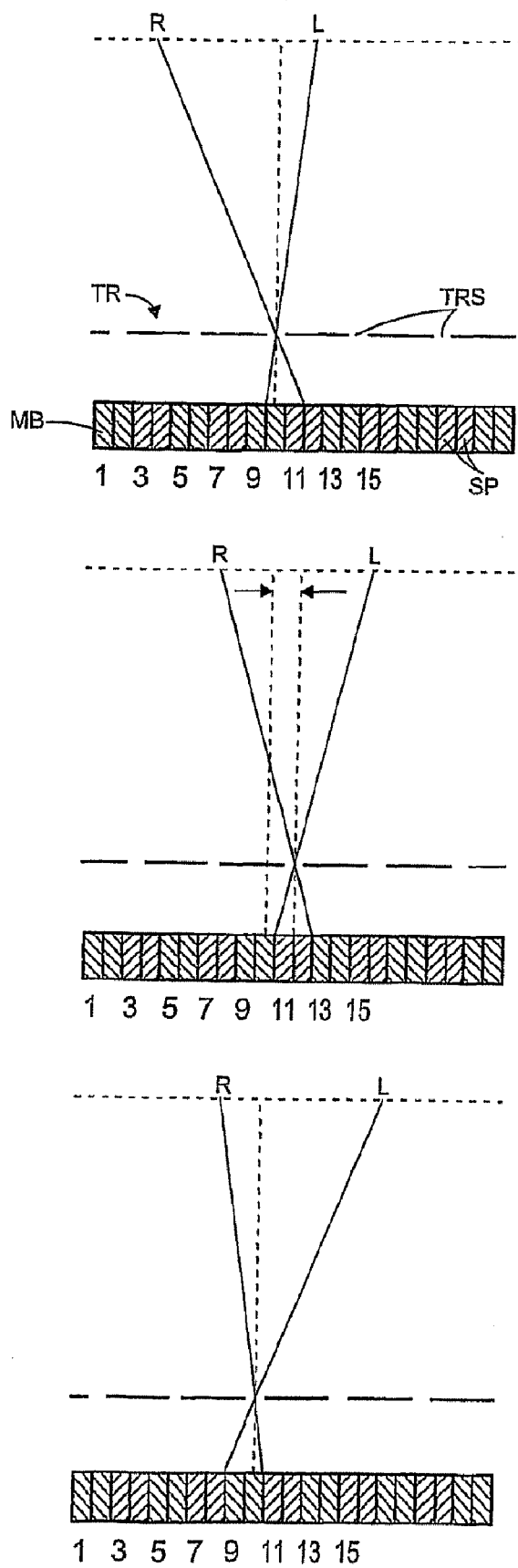
FIG. 9 an addressable separating raster for sub-subpixel tracking.

FIG. 9 shows a section view of a separating raster TR in front of the matrix screen MB with oblique separating stripes TRS and a covering of four subpixels SP in three different switching states. The separating raster TR is electronically addressable with regard to the currently addressed and opened separating stripes TRS. The view on the top shows the separating raster TR with an activation of the separating stripes TRS with the period for an autostereoscopic operation for a single user. The view in the middle shows the same arrangement with an activation of an equal period of separating stripes TRS that, however, is offset by half the width of a subpixel SP in relation to the structure of the subpixels SP of the matrix screen MB (double arrow). By that measure, the fine tracking is continued up into the sub-subpixel area. The correct assignment of the image content is achieved by using the correct subpixel extract SPA. The selection is maintained when the user makes no or only very slight movements of the head. If it is necessary to compensate for a movement of the head in the opposite direction, another subpixel extract is to be selected. The view on the bottom again shows the activation of the original raster according to the left view of FIG. 9. But the right and the left viewing areas were shifted further to the right. For that purpose, there were used a subpixel extract SPA in which the subpixels SP of the left and right images are shifted by one subpixel position. References not explained can be gathered from the preceding figures.

FIG. 10 shows a separating raster TR with separating stripes TRS where, in the view on the top, the separating stripes were realised for operation by a single user. In the lower view, however, every second separating stripe TRS is closed. In that mode, it is possible to realise, behind the remaining opened separating stripes TRS, a parallax viewing from various image views for several users according to the number of existing subpixels SP that in turn corresponds to the number of the individual views. Every subpixel SP contains a colour information from views having a lateral disparity between each other, the address of the subpixel SP on the matrix screen MB corresponding to that one from the subpixel extract SPA of the respective view.

FIG. 11 shows subpixels SP with a double bevel AS at the corners along the oblique separating raster TR. The bevels AS in the subpixels SP were regrouped in part in order to reduce the crosstalk between the subpixel sets (SP-Set L, SP-Set R). The optimum adjustment of the double-bevelled subpixels SP to the oblique separating raster TR is well visible.

LIST OF REFERENCES

α slope angle of TR
a broad side of SP, variant a with 4 SP
API user interface
AS bevel
b narrow side of SP, variant b with 6 SP
BZ scanning line
D distance TR-MB
GK graphics adapter
GT graphics driver
KS camera signal
L left image view, left eye
LB lens width
L-Buffer left memory
MB matrix screen
MTV Multiplex Track Method
$MUX_i$ multiplex scheme
MUX-Buffer multiplex memory
nP number of integral pixels
P pixel
PT pupil tracker
R right image view, right eye
R-Buffer right memory
RE computing unit
SP subpixel
SPA subpixel extract
SP-Set L left subpixel set
SP-Set R right subpixel set
SVK stereo video camera
TE separating element
TR separating raster
TRS separating stripe
TS tracking system
ZL cylindrical lens

The invention claimed is:

1. A method for the autostereoscopic production of three-dimensional image information from scanned subpixel extracts from at least one right and one left image view on a matrix screen having colour-assigned subpixels in scanning lines with an optical separating raster in which the periodicity of the separating elements in horizontal direction corresponds to a) four or b) six subpixels and the separating elements extend obliquely in relation to the matrix of the screen at an inclination corresponding to the small side ratio of the subpixels, comprising the steps of:

storing the addresses of the subpixels (SP) of the right image view (R) in a right memory (R-Buffer) and storing the addresses of the subpixels (SP) of the left image view (L) in a left memory (L-Buffer), determining the current eye position of at least one viewer, forming a current subpixel extract (SPA) that maintains the addresses of the subpixels (SP) in the right and left memories (R-Buffer, L-Buffer) and starting, conditioned by the current eye position determined, on the first to a) fourth or b) sixth subpixel (SP) in a selected scanning line (BZ) of the matrix screen (MB) beneath the first separating element (TE) by progressively alternating line by line a) two or b) three adjacent subpixels (SP) from the right memory (R-Buffer) directly beside a) two or b) three adjacent subpixels (SP) from the left memory (L-Buffer), making an offset line by line by one subpixel (SP) in direction of the inclination (α) of the separating raster (TR) and making an adjustment in the edge region of the matrix screen (MB).

2. A method according to claim 1, further comprising the step of predefining a) four or b) six different multiplex schemes ($MUX_i$), starting with the first to a) fourth or b) sixth subpixel (SP) in the selected scanning line (BZ), to form the current subpixel extract (SPA) depending on the determined current eye position.

3. A method according to claim 1, further comprising the steps of predefining three different multiplex schemes ($MUX_i$), starting with the first, second or third subpixel (SP) in the selected scanning line (BZ) and jumping by an integral pixel number (NP) to form the current subpixel extract (SPA) depending on the determined current eye position.

4. A method according to claim 1, or 2, or 3, further comprising the step of selecting the first scanning line (BZ) for the start of the predefined multiplex scheme ($MUX_i$).

5. A method according to claim 1, or 2, or 3, wherein the step of, determining the current eye position comprises involving a tracking procedure for finding head or eye details of the at least one viewer.

6. A method according to claim 5, wherein the determining of the current eye position is accomplished by a video-based tracking procedure.

7. A method according to claim 5, further comprising the step of dynamically changing the capturing setting for the image views (R, L) depending on the current eye position determined by the tracking procedure.

8. A method according to claim 1, or 2, or 3, wherein the storing of the addresses of the subpixels is accomplished by a dynamic storage of the image views (R, L) from a stereo video data format for moving images.

9. A method according to claim 8, further comprising the step of automatically adjusting the resolution of the image views (R, L) to the resolution of the matrix screen (MB).

10. A method according to claim 9, wherein the automatic adjusting of the resolution is accomplished by varying the distance of the separating raster (TR) to the matrix screen (MB).

11. A method according to claim 10, wherein the varying of the distance is accomplished by an addressing of the separating raster (TR) for activating or blocking the individual separating elements (TE).

12. A method according to claim 11, further comprising addressing alternating between the separating elements (TE) in the predefined periodicity and separating elements (TE) in a further periodicity that is equal to the predefined periodicity but has a lateral offset by half the width of a subpixel (SP).

13. A method according to claims 1, or 2, or 3, further comprising: dividing the right image view (R) into a first right and a second right image view (R1, R2) and dividing the left image view (L) into a first left and a second left image view (L1, L2), storing the addresses of the subpixels (SP) of the first and second right image view (R1, R2) in a first and second right memory and of the first and second left image view (L1, L2) in a first and second left memory, forming the current subpixel extract (SPA) by progressively alternating line by line of a) two or b) three adjacent subpixels (SP) from the respective both right or left image views (R1/R2, L1/L2), and tracking head or eye details of two viewers, wherein always one left and one right image view (R1/L1, R2/L2) is assigned to each of the viewers.

14. A method according to claim 1, or 2, or 3, further comprising: dividing the right image view into a first, second and third right image view and dividing the left image view into a first, second and third left image view, storing the addresses of the subpixels of the first, second and third right image view in a first, second and third right memory and of the first, second and third left image view in a first, second and third left memory, forming the current subpixel extract by progressively alternating line by line of a) two or b) three adjacent subpixels from the respective three right or left image views, and tracking head or eye details of three viewers, wherein always one left and one right image view is assigned to each of the viewers.

15. A method according to claim 4, further comprising the step of switching-over of the tracking procedure between the tracking of one, two or three viewers depending on the distance of the front viewer to the matrix screen (MB).

16. A method according to claim 15, wherein the switching-over includes an additional mode for tracking-free multi-view representation of N image views, in particular with N=8, and a manual or automatic switching-over between the tracked stereoscopic representation for one, two or three viewers and the non-tracked multi-view representation for more than two viewers depending on the distance of the front viewer to the matrix screen (MB).

17. An arrangement for the implementation of a method for the autostereoscopic production of three-dimensional image information from scanned subpixel extracts from at least one right and one left image view, the arrangement comprising:
  a matrix screen having colour-assigned subpixels in scanning lines,
  an optical separating raster in which the periodicity of the separating elements in horizontal direction corresponds to a) four or b) six subpixels and the separating elements extend obliquely in relation to the matrix of the screen at an inclination corresponding to the small side ratio of the subpixels,:
  at least one tracking system for detecting head or eye details of a viewer,
  at least one right memory (R-buffer) and one left memory (L-Buffer) as well as a multiplex memory (MUX-Buffer) for storing a currently formed subpixel extract (SPA) and
  a computing unit (RE) for forming the current subpixel extract (SPA) and for controlling the process flow and the individual components of the arrangement, the computing unit being configured for performing the steps of
  storing addresses of the subpixels of the right image view in the right memory and storing addresses of the subpixels of the left image view in the left memory,
  determining, by means of the tracking system, a current eye position of at least one viewer and
  forming the current subpixel extract that maintains the addresses of the subpixels in the right and left memories and starting, conditioned by the current eye position determined, on the first to a) fourth or b) sixth subpixel in a selected scanning line of the matrix screen beneath the first separating element by progressively alternating line by line a) two or b) three adjacent subpixels from the right memory directly beside a) two or b) three adjacent subpixels from the left memory, making an offset line by line by one subpixel in direction of the inclination of the separating raster and making an adjustment in an edge region of the matrix screen.

18. An arrangement according to claim 17, further comprising a video-based tracking system (TS).

19. An arrangement according to claim 17 or 18, further comprising a) two or b) three tracking systems (TS) for detecting head or eye details of a) two or b) three viewers.

20. An arrangement according to claim 19, further comprising a separating raster (TR) the distance of which to the matrix screen (MB) is variable and/or that is removable.

21. An arrangement according to claim 20, wherein the separating raster (TR) comprises a lenticular raster with cylindrical lenses (ZL) arranged obliquely in relation to the matrix screen (MB) as separating elements (TE).

22. An arrangement according to claim 20, wherein the separating raster (TR) comprises a stripe raster with separating stripes (TRS) arranged obliquely in relation to the matrix screen (MB) as separating elements (TE).

23. An arrangement according to claim 22, further comprising a controllable activatability of the separating stripes (TRS), wherein the latter are arranged in two groups with the same periodicities with an offset by half the width of a subpixel (SP) to one another.

24. An arrangement according to claim 23, further comprising a bevel (AS) of the subpixels (SP) on one or both sides extending in direction of the oblique separating raster (TR).

* * * * *

UNITED STATES PATENT AND TRADEMARK OFFICE
CERTIFICATE OF CORRECTION

PATENT NO. : 8,130,272 B2
APPLICATION NO. : 11/720707
DATED : March 6, 2012
INVENTOR(S) : Siegmund Pastoor et al.

It is certified that error appears in the above-identified patent and that said Letters Patent is hereby corrected as shown below:

On the Face Page

(73) Assignee: Please delete "Fraunhofer-Gesellschaft zur Forderung der angewandten Forschung e.V." and insert --Fraunhofer-Gesellschaft zur Förderung der angewandten Forschung e.V.--

In the Claims

Column 15, Line 34, please delete "of" before --the--.

Signed and Sealed this
Seventeenth Day of April, 2012

David J. Kappos
*Director of the United States Patent and Trademark Office*